United States Patent
Hochberg et al.

[19]

[11] Patent Number: 5,844,991
[45] Date of Patent: Dec. 1, 1998

[54] SCRIPT IDENTIFICATION FROM IMAGES USING CLUSTER-BASED TEMPLATES

[75] Inventors: Judith G. Hochberg; Patrick M. Kelly, both of Los Alamos; Timothy R. Thomas, Santa Fe, all of N. Mex.

[73] Assignee: The Regents of the University of California, Oakland, Calif.

[21] Appl. No.: 511,338

[22] Filed: Aug. 7, 1995

[51] Int. Cl.⁶ .................................................. G06K 9/46
[52] U.S. Cl. .......................... 382/218; 382/177; 382/225
[58] Field of Search ................................... 382/173, 177, 382/181, 209, 217, 218, 221, 224, 225, 229

[56] References Cited

U.S. PATENT DOCUMENTS

| | | | |
|---|---|---|---|
| 5,319,721 | 6/1994 | Chefalas et al. | 382/160 |
| 5,442,715 | 8/1995 | Gaborski et al. | 382/187 |
| 5,444,797 | 8/1995 | Spitz et al. | 382/177 |

OTHER PUBLICATIONS

A. Lawrence Spitz, "Script and Language Determination from Document Images," Proceedings of the Third Annual Symposium on Document Analysis and Information Retrieval, pp. 229–235 (1994).

Penelope Sibun et al., "Language Determination: Natural Language Processing from Scanned Document Images," To appear in proceedings of ANLP 94, pp. 115–121.

Takehiro Nakayama et al., "European Language Determination from Image," Proceedings of the Second International Conference on Document Analysis and Recognition, pp. 159–162 (1993).

*Primary Examiner*—Leo Boudreau
*Assistant Examiner*—Brian P. Werner
*Attorney, Agent, or Firm*—Ray G. Wilson

[57] ABSTRACT

A computer-implemented method identifies a script used to create a document. A set of training documents for each script to be identified is scanned into the computer to store a series of exemplary images representing each script. Pixels forming the exemplary images are electronically processed to define a set of textual symbols corresponding to the exemplary images. Each textual symbol is assigned to a cluster of textual symbols that most closely represents the textual symbol. The cluster of textual symbols is processed to form a representative electronic template for each cluster. A document having a script to be identified is scanned into the computer to form one or more document images representing the script to be identified. Pixels forming the document images are electronically processed to define a set of document textual symbols corresponding to the document images. The set of document textual symbols is compared to the electronic templates to identify the script.

19 Claims, 4 Drawing Sheets

Fig. 2A
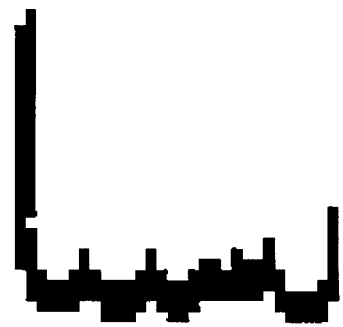
Fig. 2B
Fig. 2C
Fig. 2D

Arabic

Armenian

Burmese

Chinese

Cyrillic

Devanagari

Hebrew

Japanese

Korean

Latin

Thai

SCRIPT IDENTIFICATION FROM IMAGES USING CLUSTER-BASED TEMPLATES

BACKGROUND OF THE INVENTION

This invention relates to document identification, and, more particularly, to the identification of the script used in document preparation. This invention was made with government support under Contract No. W-7405-ENG-36 awarded by the U.S. Department of Energy. The government has certain rights in the invention.

Script identification is an important part of the automatic processing of document images in an international environment. Such images are typically produced photographically, by scanning a hardcopy document into a computer, but they may also be produced electronically from a source text file. For scanned documents, optical character recognition (OCR) is usually the first step applied to a document image. The script in which the document is written must be known in order to choose the correct OCR algorithm.

Further processing, such as indexing or translation, depends on identifying the language used in a document, and, again, script identification is crucial. For scripts like Korean, which are used by only one language, script identification accomplishes language identification. For scripts like Roman, which are shared by many languages, script identification is a necessary first step. For example, once a document's script has been identified as Roman, one can OCR the image and then look for frequently occurring character sequences from English, French, etc. to identify the language. See, e.g., K. Church, "Stress Assignment in Letter to Sound Rules for Speech Synthesis," Proceedings of ICASSP 1986 (Tokyo), pp. 2423–6.

Script identification normally is done manually by knowing the document's country of origin or by examining the document. In an environment where the volume and variety of scripts make manual identification unworkable, the ability to automatically determine the script, and further, the language of a document, would reduce the time and cost of document handling.

In one technique for automatic script identification (see, e.g., A. L. Spitz, "Script and Language Determination from Document Images," Proceedings of the Third Annual Symposium on Document Analysis and Information Retrieval, pp. 229–235 (1994)), an initial division is made between Asian scripts (Chinese, Korean, or Japanese) and Roman. This distinction is based on feature analysis. One feature is the vertical distance between upward concavities in characters and some reference point, such as the character's middle ("centroid"). Asian scripts (Korean, Japanese, and Chinese) have a more even distribution of upward concavities along the vertical axis than do Roman or Cyrillic scripts. Once this initial distinction is made, further distinction among Asian scripts are made on the basis of character density (how many black pixels a character has). These various features used for script identification were chosen as a result of automated and manual optical analysis.

One disadvantage of this approach is that it requires a hands-on analysis of each script input to the system. Another problem is the specialized handling of character fragments and joined characters. The phenomena invariably occur when documents undergo successive treatments such as copying and scanning. Prior art characterization conceptualizes these phenomena as errors to be corrected, and therefore tries to reconstruct fragmented characters and to separate joined characters. These remedies may not always be successful, and make preprocessing more complex.

Accordingly, it is an object of the present invention to provide a script identification process that can automatically learn distinctions among an arbitrary number of scripts.

Another object of the present invention is to include character fragments and joined characters as normal textual symbols for use in the identification process to avoid specialized preprocessing steps.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, this invention may comprise a computer-implemented method for identifying a script used to create a document. A set of training documents for each script to be identified is scanned into the computer to store a series of exemplary images representing each script. Pixels forming the exemplary images are electronically processed to define a set of textual symbols corresponding to the exemplary images. Each textual symbol is assigned to a cluster of textual symbols that most closely represents the textual symbol. Each cluster of textual symbols is processed to form a representative electronic template. A document having a script to be identified is scanned into the computer to form one or more document images representing the script to be identified. Pixels forming the document images are electronically processed to define a set of document textual symbols corresponding to the document images. The set of document textual symbols is compared to the electronic templates to identify the script.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 2A–D are pictorial representations of the effect of rescaling electronic textual symbols.

DETAILED DESCRIPTION OF THE INVENTION

Figure 1:
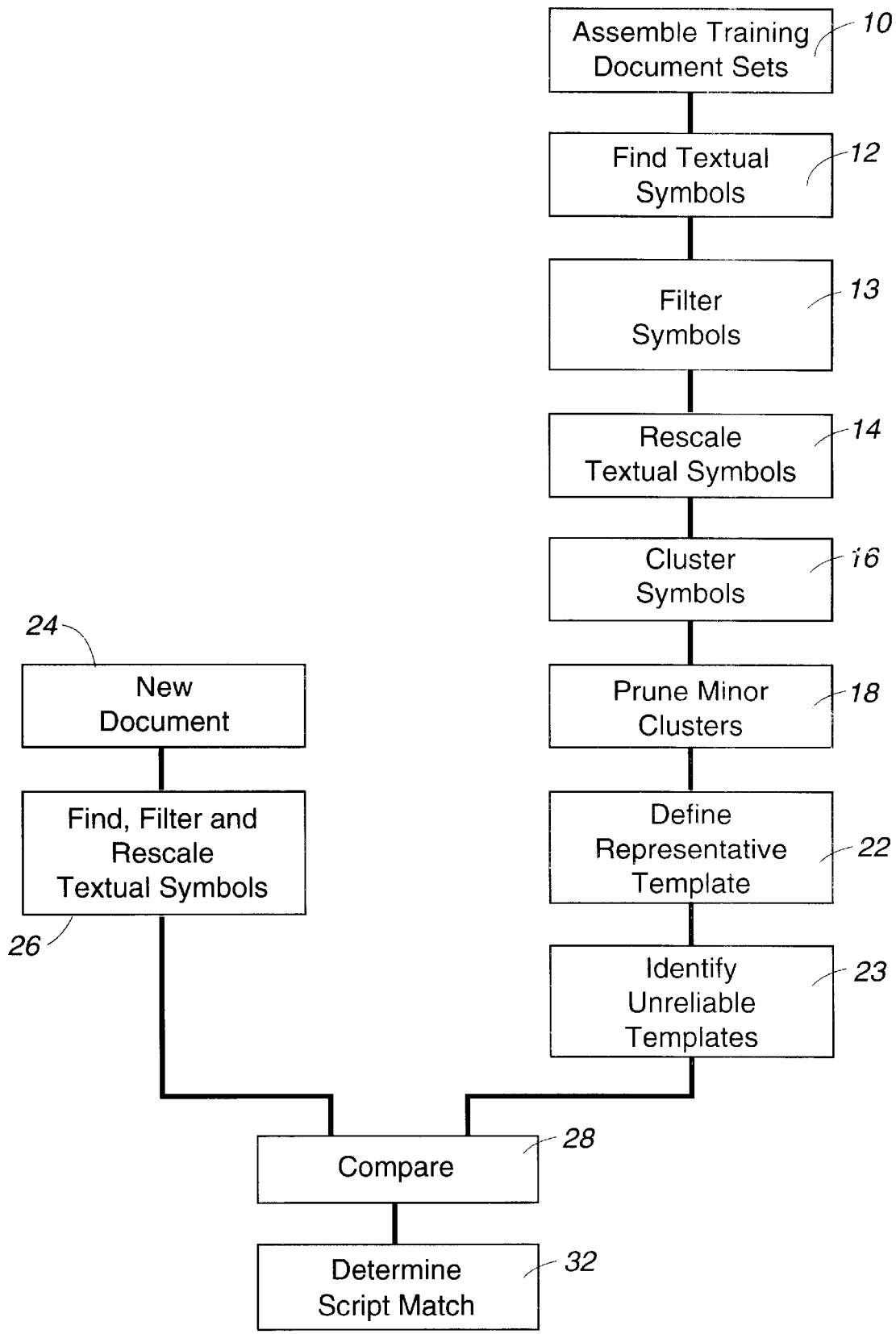
FIG. 1 is a process flow diagram for identifying a script according to one embodiment of the present invention.
Figure 3A:
FIGS. 3A–K are pictorial representations of electronic textual symbols that form the most frequent reliable templates for a variety of writing styles.
Figure 3B:
Figure 3C:
Figure 3D:
Figure 3E:
Figure 3F:
Figure 3G:
Figure 3H:
Figure 3I:
Figure 3J:
Figure 3K:

In accordance with the present invention, a script identifier process implemented by a programmed computer learns distinctions among an arbitrary number of scripts whereby the distinctions serve to uniquely identify a particular script. In a broad view, the process finds frequent character or word shapes in each script by means of cluster analysis and then looks for instances of these shapes in new documents. As shown in FIG. 1, cluster analysis is used to derive a representative set of templates from textual symbols in a set of training documents 10. Textual symbols are first identified 12. Relatively tall symbols and symbols having only a relatively small number of pixels are filtered 13 from the identified textual symbols. The remaining textual symbols are then rescaled 14 to form the representative textual symbols.

The rescaled textual symbols 14 are then arranged in clusters 16. Clusters with a low number of members are pruned 18 from the cluster set and are not further considered. As used herein, pixels are assigned gray scale values from 0 (black) to 255 (white). For the remaining clusters, corresponding pixel values in the rescaled textual symbols that are associated with each cluster are processed to define a representative symbol, or template, 22 for the cluster. In a preferred embodiment, the templates are compared 23 to textual symbols from the training set to determine templates that are unreliable, i.e., templates that identify incorrect scripts more than a preselected number of times.

To identify the script presented in a new document 24, textual symbols in the unknown script are processed and rescaled 26 in the same manner 12, 14 as for the training document sets 10. The rescaled textual symbols 26 are then compared 28 with the representative templates 22 for the scripts on which the system has trained. The script whose templates provide the best match is selected 32 for use in further processing the new document.

Thus, the process of the present invention has four basic process steps, three of which are implemented on a programmed computer:

1. A set of documents is assembled as a training set with representative type fonts for each script to be identified.
2. Textual symbols in the training set are identified and rescaled.
3. Similar symbols are clustered within each script. Representative templates are formed from all of the members of a cluster, minor clusters are discarded, and unreliable templates are identified.
4. Textual symbols from new documents are compared with the templates to form a best match for script identification.

In an exemplary process, a publicly available software development system, Khoros (J. Rasure et al., "An Integrated Visual Language and Software Development Environment," 2 J. Visual Language, pp. 217–246 (1991)), is used as a framework for building clustering routines and region growing routines according to available algorithms.

In accordance with the present process, a set of training documents is selected to be representative of a script that is to be automatically identified. The set is preferably representative of relevant font types for each script. For example, the Roman training set should include examples of both serif and sans serif fonts. For scripts used by several languages, the training set should include documents representative of the range of languages encompassed by the scripts. In this way the resulting templates will include the variations found within the script, such as diacritics and special characters.

The training set of documents is then electronically scanned into a computer for further processing. By scanned is meant that the physical representations of the script are converted to an electronic bit map of the image, i.e., a plurality of pixels that are generally black or white and arranged in a pattern that closely approximates the physical representation. Each pixel represents a small discrete portion of the image. It will be appreciated that an accurate bit map representation of an element of script depends on the training documents being correctly oriented, i.e., not skewed upside-down, sideways, or in between. If any documents are skewed, standard image warping algorithms should be applied before the training process begins.

A script data set was selected consisting of 281 document images from 33 languages written in 13 scripts, including two scripts with connected characters (Arabic and Devanagari). The images were scanned into the computer from books, newspapers, magazines, and computer printouts. The training set had ten images from each script. An image is a bitmap representation of a page from each script, with at least two images from each source used. A variety of type styles were included for each script, such as original Chinese characters and simplified characters, and oblique and straight Armenian fonts. The test set had five images from each script, drawn from the same sources as the training set (e.g., an additional page from the same book). A challenge set was then constructed with up to 16 images from each script, drawn from sources not used in the training and test sets, including novel fonts and languages. No handwritten documents were included.

The scanned images were then used to define a set of textual symbols corresponding to each script. In an exemplary technique, a region growing algorithm was used to identify symbols in the training set. A suitable region growing algorithm is found in R. C. Gonzalez, *Digital Image Processing*, Addison-Wesley, Reading, Mass. (1992), pp. 458–465. In the region growing algorithm, the pixel values in the image were examined in turn. When a pixel value corresponding to black was found, the computer program then advanced to an adjacent pixel in any of eight direction: top, bottom, left, right, and the four diagonals. When an adjacent black pixel is found, the program tries to then "grow" outward from that pixel.

The set of contiguous black pixels is herein called a "region." The growing process for each region continues until the process fails to find any additional "black" pixels. A "bounding box," i.e., a set of four (x,y) pixel coordinates defining the smallest possible rectangle around the region, is identified for each region in the image. Non-textual symbols are removed by filtering out regions that contain too few pixels, e.g., less than 10 pixels, or whose bounding boxes were too big, e.g., greater than 80 pixels high. In order to process connected scripts, such as Arabic and Devanagari, large and long regions were retained for all images to avoid filtering out useful textual symbols. It will be understood that the above process is described for black foreground on white background representations, but the same process could be used for growing "white" regions, i.e., white foreground on black background.

The size of each bounding box was then rescaled, e.g., to an array of 30×30 pixels in order to equalize font (point) sizes between documents. For connected scripts, rescaling caused individual word characteristics to become distorted while preserving the overall Arabic or Devanagari look of the word. FIGS. 2A and 2B and FIGS. 2C and 2D are exemplary physical representations corresponding to the electronic representations of whole words in Arabic and Devanagari, respectively, that have been rescaled to normalize the scanned representation.

Once the textual symbols in each script have been identified and rescaled, a computer implemented clustering process (R. O. Duda et al., *Pattern Classification and Scene Analysis*, New York: Wiley (1973)) was used to form templates. Each training symbol was examined in turn to determine a cluster of training symbols that most closely represented the textual symbol. In an exemplary embodiment, given a new training symbol, the process determined the Hamming distance between the symbol and the initial symbol in each existing cluster. If the most similar cluster yielded a distance of less than 250 pixel disagreements (out of 900 for the 30x30 symbols), then the new training symbol was added to that cluster. Otherwise it was assigned to a new cluster. The decision threshold of 250 pixels was chosen empirically by determining the number of clusters made at different settings and selecting what seemed to be a stable point. This parameter caused visually similar symbols to be clustered together, while distant symbols were assigned to different clusters.

Figure 4:
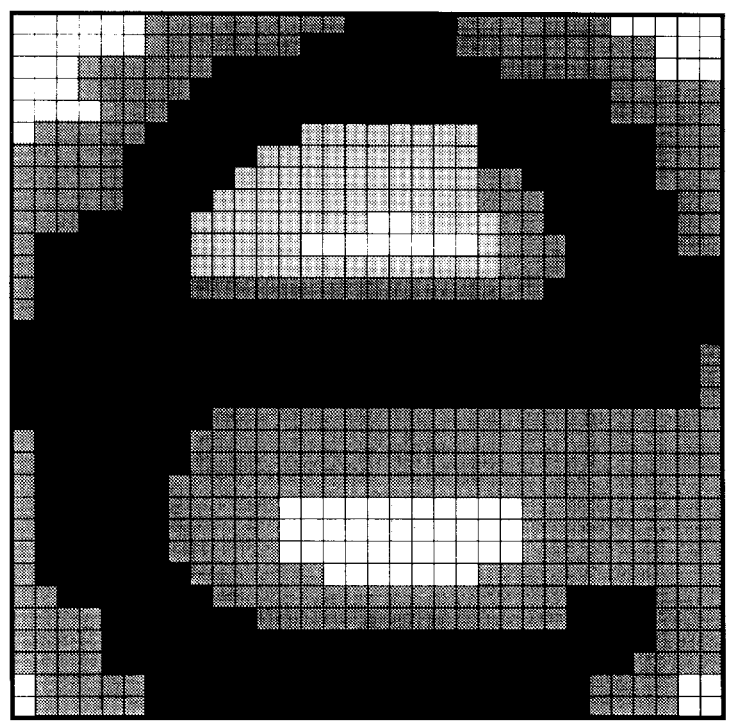
FIG. 4 is a pictorial representation of a precursor electronic textual symbol used to form a template for the Roman lower case letter "e."

Once the symbols have been clustered, a template is formed from the pixel values of all the symbols in each cluster. In one exemplary method, a value for each pixel forming the template is determined by a pixel-by-pixel average (a byte value from 0 to 255) of all the symbols in the cluster. A visual representation of a cluster average for the Roman letter "e" is shown in FIG. 4. A template is then formed by downcasting each byte to a bit (black-and-white) by thresholding at a gray scale value of 128.

The template set is "pruned," in the process of forming the templates i.e., templates with only one or two assigned textual symbols are eliminated in order to focus on the templates that were most likely to be useful, and to speed up the identification process. Pruning can occur either before or after pixel processing. The preferred order is to prune before processing to eliminate unnecessary processing.

In the exemplary training set discussed above, a second pass was made through the training set in order to quantify the reliability of the remaining templates. For each training symbol, the best overall match was determined from among all templates based on Hamming distance and, for each template, the number of symbols matched to the template were determined and the number of correct matches were determined. For example, of the 479 training symbols best-matched to a particular Cyrillic template, 468 were Cyrillic, giving a reliability figure of 98%. Table A summarizes the number of templates made for each script. FIGS. 3A–K illustrate physical representations of the two most frequent templates from each script with a reliability figure of at least 90%.

The script used to create a new document is identified by identifying and rescaling textual symbols from the new document and comparing the document textual symbols with the templates created from the training images. In one exemplary process, N textual symbols were identified and rescaled. Each symbol is compared with the templates and a best match was found within each script based on Hamming distance. Symbols whose overall best match (across all scripts) was to a template with reliability less than R were ignored and the mean matching score was determined for each script across all symbols that were retained. The script with the best mean matching score was selected. If none of the N symbols examined was best-matched to a reliable template, the document was classified as "script unknown".

TABLE A

| | TEMPLATES | | |
|---|---|---|---|
| Script | Original templates | % Eliminated | Final templates |
| Arabic | 148 | 14 | 127 |
| Armenian | 195 | 21 | 155 |
| Burmese | 432 | 34 | 283 |
| Chinese | 1623 | 50 | 804 |
| Cyrillic | 329 | 32 | 223 |

TABLE A-continued

| | TEMPLATES | | |
|---|---|---|---|
| Script | Original templates | % Eliminated | Final templates |
| Devanagari | 674 | 30 | 470 |
| Ethiopic | 390 | 33 | 261 |
| Greek | 284 | 37 | 178 |
| Hebrew | 140 | 23 | 108 |
| Japanese | 719 | 49 | 367 |
| Korean | 339 | 18 | 279 |
| Roman | 337 | 33 | 226 |
| Thai | 463 | 28 | 334 |

A number of test documents and challenge (unknown) documents were processed by the computer implemented script identification process described above. As noted, the test documents were passages from the same documents used to train the process and create the templates; the challenge set was a new set of documents that included fonts and languages that were not necessarily in the training set. Table B shows the number of misclassified document images (test/challenge) as a function of the number of textual symbols examined for the documents and a reliability threshold for script identification. There were 65 test documents and 68 challenge documents presented to the system.

As shown in Table B, with a number of document textual symbols greater than 75 and a reliability threshold greater than 50%, none of the test documents misclassified and only 2 or 3 challenge documents were misclassified. It

TABLE B

| MISCLASSIFIED DOCUMENT IMAGES (test/challenge) | | | | | |
|---|---|---|---|---|---|
| Symbols | R = 50% | 60% | 70% | 80% | 90% |
| 10 | 5/21 | 5/20 | 4/17 | 6/22 | 9/25 |
| 20 | 0/11 | 0/9 | 0/8 | 1/11 | 2/10 |
| 30 | 0/7 | 0/7 | 0/8 | 1/8 | 1/8 |
| 40 | 0/4 | 0/2 | 0/3 | 0/4 | 1/3 |
| 50 | 0/3 | 0/3 | 0/3 | 0/3 | 1/2 |
| 75 | 0/5 | 0/4 | 0/3 | 0/4 | 0/1 |
| 100 | 0/3 | 0/3 | 0/2 | 0/2 | 0/2 |
| 150 | 0/3 | 0/2 | 0/2 | 0/2 | 0/2 |
| 200 | 0/2 | 0/2 | 0/2 | 0/2 | 0/2 |
| 250 | 0/2 | 0/2 | 0/2 | 0/2 | 0/2 |
| 300 | 0/3 | 0/2 | 0/2 | 0/2 | 0/2 |
| 350 | 0/3 | 0/2 | 0/3 | 0/2 | 0/2 |
| 400 | 0/4 | 0/3 | 0/2 | 0/2 | 0/2 |
| 450 | 0/3 | 0/3 | 0/3 | 0/2 | 0/2 |
| 500 | 0/3 | 0/2 | 0/3 | 0/2 | 0/2 |

It should be noted that all of the misclassified challenge documents were printed in fonts that were markedly different from those in the training set. For example, a German image in the Fraktur font was misclassified as Ethiopic or Thai; a Spanish image in italics was misclassified as Armenian; and a Cyrillic image in a modern sans-serif font was misclassified as Roman or Greek. The limited number of misclassified documents illustrates that the system is able to generalize except in extreme cases.

The system described herein learns to accurately distinguish among a set of scripts that includes alphabetic and non-alphabetic scripts, discrete and connected scripts, and pairs or triplets of fairly similar scripts. Little preprocessing is required. The system overcomes "noise" in the form of moderate skew, numerals, foreign characters, illustrations, and conjoined or fragmented characters to provide accurately classified script types.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method for identifying a script used to create a document, including the steps of:

scanning into said computer a set of training documents for each script to be identified to store a series of exemplary images representing said each script;

electronically processing pixels forming said exemplary images to electronically define a set of textual symbols corresponding to said exemplary images;

assigning each textual symbol to a cluster of textual symbols that most closely represents said textual symbol;

forming a representative electronic template for each said cluster;

scanning into said computer a document having a script to be identified to form one or more of document images representing said script to be identified;

electronically processing pixels forming said document images to electronically define a set of document textual symbols corresponding to said document images; and comparing said set of document textual symbols to said electronic templates to identify said script.

2. A computer implemented method for identifying a script according to claim 1, where said set of training documents includes representative font types from said each script.

3. A computer implemented method for identifying a script according to claim 1, wherein said step of defining a set of textual symbols further includes the steps of:

electronically examining scanned images to locate sets of contiguous black pixels, where each one of said sets defines a region;

electronically defining a bounding box comprising the smallest set of rectangular pixel coordinates that encloses each said region;

rescaling each said bounding box to a rescaled box to form a textual symbol defined within said rescaled box.

4. A computer implemented method for identifying a script according to claim 2, wherein said step of defining a set of textual symbols further includes the steps of:

electronically examining scanned images to locate sets of contiguous black pixels, where each one of said sets defines a region;

electronically defining a bounding box comprising the smallest set of rectangular pixel coordinates that encloses each said region;

rescaling each said bounding box to a rescaled box to form a textual symbol defined within said rescaled box.

5. A computer implemented method for identifying a script according to claim 1, wherein the step of assigning each said textual symbol to a cluster of textual symbols further includes the steps of:

determining the similarity between each said textual symbol and each said cluster of textual symbols;

assigning said textual symbol to an existing cluster with which said textual symbol has at least a predetermined minimum similarity; and assigning said textual symbol to a new cluster when said textual symbol does not have at least said predetermined minimum similarity with an existing cluster.

6. A computer implemented method for identifying a script according to claim 2, wherein the step of assigning each said textual symbol to a cluster of textual symbols further includes the steps of:

determining the similarity between each said textual symbol and each said cluster of textual symbols;

assigning said textual symbol to an existing cluster with which said textual symbol has at least a predetermined minimum similarity; and assigning said textual symbol to a new cluster when said textual symbol does not have at least said predetermined minimum similarity with an existing cluster.

7. A computer implemented method for identifying a script according to claim 3, wherein the step of assigning each said textual symbol to a cluster of textual symbols further includes the steps of:

determining the similarity between each said textual symbol and each said cluster of textual symbols;

assigning said textual symbol to an existing cluster with which said textual symbol has at least a predetermined minimum similarity; and assigning said textual symbol to a new cluster when said textual symbol does not have at least said predetermined minimum similarity with an existing cluster.

8. A computer implemented method for identifying a script according to claim 4, wherein the step of assigning each said textual symbol to a cluster of textual symbols further includes the steps of:

determining the similarity between each said textual symbol and each said cluster of textual symbols;

assigning said textual symbol to an existing cluster with which said textual symbol has at least a predetermined minimum similarity; and assigning said textual symbol to a new cluster when said textual symbol does not have at least said predetermined minimum similarity with an existing cluster.

9. A computer implemented method for identifying a script according to claim 1, wherein said representative electronic template is formed with each pixel value determined from a representative value from corresponding pixel values in said textual symbols assigned to said image cluster.

10. A computer implemented method for identifying a script according to claim 2, wherein said representative electronic template is formed with each pixel value determined from a representative value from corresponding pixel values in said textual symbols assigned to said image cluster.

11. A computer implemented method for identifying a script according to claim 3, wherein said representative electronic template is formed with each pixel value determined from a representative value from corresponding pixel values in said textual symbols assigned to said image cluster.

12. A computer implemented method for identifying a script according to claim 4, wherein said representative electronic template is formed with each pixel value determined from a representative value from corresponding pixel values in said textual symbols assigned to said image cluster.

13. A computer implemented method for identifying a script according to claim 5, wherein said representative electronic template is formed with each pixel value determined from a representative value from corresponding pixel values in said textual symbols assigned to said image cluster.

14. A computer implemented method for identifying a script according to claim 8, wherein said representative electronic template is formed with each pixel value determined from a representative value from corresponding pixel values in said textual symbols assigned to said image cluster.

15. A computer implemented method for identifying a script according to claim 1, further including the steps of:

determining the reliability of each said cluster of textual symbols to correctly identify script forming said set of training documents; and identifying templates having a low reliability to correctly identify said script forming said test documents.

16. A computer implemented method for identifying a script according to claim 2, further including the steps of:

determining the reliability of each said cluster of textual symbols to correctly identify script forming said set of training documents; and identifying templates having a low reliability to correctly identify said script forming said test documents.

17. A computer implemented method for identifying a script according to claim 3, further including the steps of:

determining the reliability of each said cluster of textual symbols to correctly identify script forming said set of training documents; and identifying templates having a low reliability to correctly identify said script forming said test documents.

18. A computer implemented method for identifying a script according to claim 5, further including the steps of:

determining the reliability of each said cluster of textual symbols to correctly identify script forming said set of training documents; and identifying templates having a low reliability to correctly identify said script forming said test documents.

19. A computer implemented method for identifying a script according to claim 9, further including the steps of:

determining the reliability of each said cluster of textual symbols to correctly identify script forming said set of training documents; and identifying templates having a low reliability to correctly identify said script forming said test documents.

* * * * *